(12) United States Patent
Motoki et al.

(10) Patent No.: US 8,902,317 B2
(45) Date of Patent: Dec. 2, 2014

(54) CAMERA WITH DATA TRANSMISSION CONTROL UNIT

(75) Inventors: Yasuyuki Motoki, Yokohama (JP); Toshiyuki Nakamura, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/064,734

(22) Filed: Apr. 12, 2011

(65) Prior Publication Data

US 2011/0193973 A1 Aug. 11, 2011

Related U.S. Application Data

(63) Continuation of application No. 12/222,019, filed on Jul. 31, 2008, now abandoned.

(30) Foreign Application Priority Data

Aug. 3, 2007 (JP) .................................. 2007-202563
Jul. 2, 2008 (JP) .................................. 2008-173248

(51) Int. Cl.
*H04N 5/225* (2006.01)
*H04N 1/00* (2006.01)
*H04N 101/00* (2006.01)

(52) U.S. Cl.
CPC .... *H04N 1/00204* (2013.01); *H04N 2201/0039* (2013.01); *H04N 2201/0055* (2013.01); *H04N 2101/00* (2013.01); *H04N 1/00461* (2013.01); *H04N 1/0014* (2013.01); *H04N 1/00413* (2013.01); *H04N 2201/0058* (2013.01); *H04N 1/00453* (2013.01); *H04N 1/00458* (2013.01); *H04N 2201/0084* (2013.01); *H04N 1/00148* (2013.01); *H04N 1/00244* (2013.01)
USPC ...................................................... 348/207.1

(58) Field of Classification Search
USPC ....................... 348/207.1, 231.7, 231.2, 231.1
See application file for complete search history.

(56) References Cited

U.S. PATENT DOCUMENTS 5,276,867 A 1/1994 Kenley et al.
5,649,196 A 7/1997 Woodhill et al.
(Continued)

FOREIGN PATENT DOCUMENTS

CN 1914908 A 2/2007
EP 1 694 065 A1 8/2006
(Continued)

OTHER PUBLICATIONS

Office Action issued in Chinese Application No. 200810145155.9 on Aug. 10, 2011. (with English language translation).

(Continued)

*Primary Examiner* — Mekonnen Dagnew
(74) *Attorney, Agent, or Firm* — Oliff PLC

(57) ABSTRACT

A camera includes: an image-capturing unit that captures an image of a subject to acquire image data; an image storing unit that stores a plurality of image data acquired by the image-capturing unit in a storage medium; an image specifying unit that specifies image data designated by a user from among the plurality of image data stored in the storage medium; and a transmission controlling unit that when transmitting the plurality of image data to an external device using a wireless communication device, identifies specified image data specified by the image specifying unit and non-specified image data that are not specified by the image specifying unit from each other and transmits the specified image data to the external device in priority to the non-specified image data.

11 Claims, 13 Drawing Sheets

(56) References Cited

U.S. PATENT DOCUMENTS

| | | | |
|---|---|---|---|
| 5,751,997 | A | 5/1998 | Kullick et al. |
| 7,057,648 | B2 | 6/2006 | Parulski et al. |
| 2001/0012066 | A1 | 8/2001 | Parulski et al. |
| 2002/0041326 | A1 | 4/2002 | Driscoll et al. |
| 2003/0025808 | A1 | 2/2003 | Parulski et al. |
| 2003/0103144 | A1 | 6/2003 | Sesek et al. |
| 2004/0064488 | A1 | 4/2004 | Sinha |
| 2004/0120591 | A1* | 6/2004 | Brower et al. ............... 382/240 |
| 2004/0201711 | A1 | 10/2004 | Lopaz |
| 2006/0128407 | A1* | 6/2006 | Kim ........................... 455/466 |
| 2006/0245739 | A1 | 11/2006 | Nagaoka et al. |
| 2006/0262346 | A1 | 11/2006 | Goto |
| 2007/0132874 | A1* | 6/2007 | Forman et al. ........... 348/333.02 |
| 2007/0291303 | A1* | 12/2007 | Tanaka et al. ............... 358/1.15 |
| 2008/0060032 | A1* | 3/2008 | Toutenhoofd ................ 725/105 |
| 2008/0235592 | A1* | 9/2008 | Trauth ........................ 715/733 |
| 2008/0297409 | A1* | 12/2008 | Klassen et al. ........... 342/357.06 |

FOREIGN PATENT DOCUMENTS

| | | |
|---|---|---|
| EP | 1 760 593 A1 | 3/2007 |
| JP | A-10-214241 | 8/1998 |
| JP | A-11-122569 | 4/1999 |
| JP | A-2001-45178 | 2/2001 |
| JP | A-2004-140641 | 5/2004 |
| JP | A-2004-356826 | 12/2004 |
| WO | WO 2007/018832 A1 | 2/2007 |

OTHER PUBLICATIONS

Nikon Coolpix S50c Digital Camera Quick Start Guide, Apr. 24, 2007.
Nikon Coolpix S50c User's Manual, Apr. 24, 2007.
Apr. 3, 2012 Office Action issued in Japanese Patent Application No. 2008-173248 (with translation).
Jun. 25, 2012 Office Action issued in Chinese Patent Application No. 200810145155.9 (with translation).

* cited by examiner

FIG.6

| FILE NAME | DESTINATION ID | TIME AND DATE OF TRANSMISSION COMPLETION |
|---|---|---|
| DSCN0001.jpg | A01, A02, G01 | |
| DSCN0002.jpg | A01, A02, A03 | |
| DSCN0003.jpg | A01, A02, G01 | |
| DSCN0004.jpg | A01 | |
| DSCN0005.jpg | A01, A02 | |
| | | |
| | | |
| | | |
| | | |

FIG.11

| DESTINATION | IMAGE FILE |
|---|---|
| E-MAIL ADDRESS OF A01, E-MAIL ADDRESS OF A02, ALL E-MAIL ADDRESSES CONTAINED IN G01 | DSCN0001.jpg, DSCN0003.jpg |
| E-MAIL ADDRESS OF A01, E-MAIL ADDRESS OF A02, E-MAIL ADDRESS OF A03 | DSCN0002.jpg |
| E-MAIL ADDRESS OF A01 | DSCN0004.jpg |
| E-MAIL ADDRESS OF A01, E-MAIL ADDRESS OF A02 | DSCN0005.jpg |

CAMERA WITH DATA TRANSMISSION CONTROL UNIT

INCORPORATION BY REFERENCE

The disclosure of the following priority application is herein incorporated by reference: this is a Continuation to application Ser. No. 12/222,019 filed Jul. 31, 2008, which in turn is a Non-Provisional Application, which claims the benefit of Japanese Patent Application No. 2007-202563 filed Aug. 3, 2007 and Japanese Patent Application No. 2008-173248 filed Jul. 2, 2008.

BACKGROUND OF THE INVENTION

1. Field of the Invention

The present invention relates to a camera for photography.

2. Description of Related Art

A digital camera has a function of uploading image data to a server and a function of transmitting an e-mail to a user of the camera when transmission of image data specified by a user to the server is completed in order to inform the user of this being the case.

SUMMARY OF THE INVENTION

The digital camera is configured to upload both of image data specified by the user and image data not specified by the user by a single connection to the server. In this case, however, it is not configured to give priority to uploading the image data specified by the user. Accordingly, a plurality of connections to the server have to be performed in order to upload the image data specified by the user and subsequently to upload the image data not specified by the user, so that the efficiency of transmission is low.

According to the first aspect of the present invention, a camera comprises: an image-capturing unit that captures an image of a subject to acquire image data; an image storing unit that stores a plurality of image data acquired by the image-capturing unit in a storage medium; an image specifying unit that specifies image data designated by a user from among the plurality of image data stored in the storage medium; and a transmission controlling unit that when transmitting the plurality of image data to an external device using a wireless communication device, identifies specified image data specified by the image specifying unit and non-specified image data that are not specified by the image specifying unit from each other and transmits the specified image data to the external device in priority to the non-specified image data.

According to the second aspect of the present invention, the camera according to the first aspect may further comprises: an information storing unit that stores information for identifying the specified image data to the storage medium.

According to the third aspect of the present invention, in the camera according to the first aspect, it is preferred that the image specifying unit specifies image data to which information about destination is related as the specified image data.

According to the fourth aspect of the present invention, in the camera according to the first aspect, it is preferred that the image specifying unit specifies image data that are designated to create a back up copy thereof in the external device as the specified image data.

According to the fifth aspect of the present invention, in the camera according to the first aspect, it is preferred that the transmission controlling unit starts transmission of the non-specified image data when transmission of the specified image data is suspended according to instruction by the user.

According to the sixth aspect of the present invention, in the camera according to the fifth aspect, it is preferred that when the transmission of the specified image data is suspended and the transmission of the non-specified image data is started, the transmission controlling unit resumes the transmission of the specified image data after the transmission of the non-specified image data is completed.

According to the seventh aspect of the present invention, in the camera according to the first aspect, it is preferred that the transmission controlling unit changes transmission priority between the specified image data and the non-specified image data such that the non-specified image data are transmitted in priority to the specified image data according to instruction by the user.

According to the eighth aspect of the present invention, a camera comprises: an image-capturing unit that captures an image of a subject to acquire image data; an image storing unit that stores a plurality of image data acquired by the image-capturing unit in a storage medium; an image specifying unit that specifies image data to which information about destination is related from among the plurality of image data stored in the storage medium; and a transmission controlling unit connected to an external device through an external wireless device of which wireless communication is established that when transmitting the plurality of image data to the external device, identifies specified image data specified by the image specifying unit and non-specified image data that are not specified by the image specifying unit from each other and transmits the specified image data to the external device through the wireless communication in priority to the non-specified image data.

According to the ninth aspect of the present invention, the camera according to the eighth aspect may further comprises: an information storing unit that stores information for identifying the specified image data to the storage medium.

According to the tenth aspect of the present invention, in the camera according to the eighth aspect, it is preferred that the transmission controlling unit starts transmission of the non-specified image data when transmission of the specified image data is suspended according to instruction by the user.

According to the eleventh aspect of the present invention, in the camera according to the tenth aspect, it is preferred that when the transmission of the specified image data is suspended and the transmission of the non-specified image data is started, the transmission controlling unit resumes the transmission of the specified image data after the transmission of the non-specified image data is completed.

According to the twelfth aspect of the present invention, in the camera according to the eighth aspect, it is preferred that the transmission controlling unit changes transmission priority between the specified image data and the non-specified image data such that the non-specified image data are transmitted in priority to the specified image data according to instruction by the user.

BRIEF DESCRIPTION OF THE DRAWINGS

FIG. 6 is a diagram showing a specific example of an e-mail notification target image list;

FIG. 11 is a diagram showing a specific example of destination list;

DESCRIPTION OF PREFERRED EMBODIMENTS

First Embodiment

Figure 1:
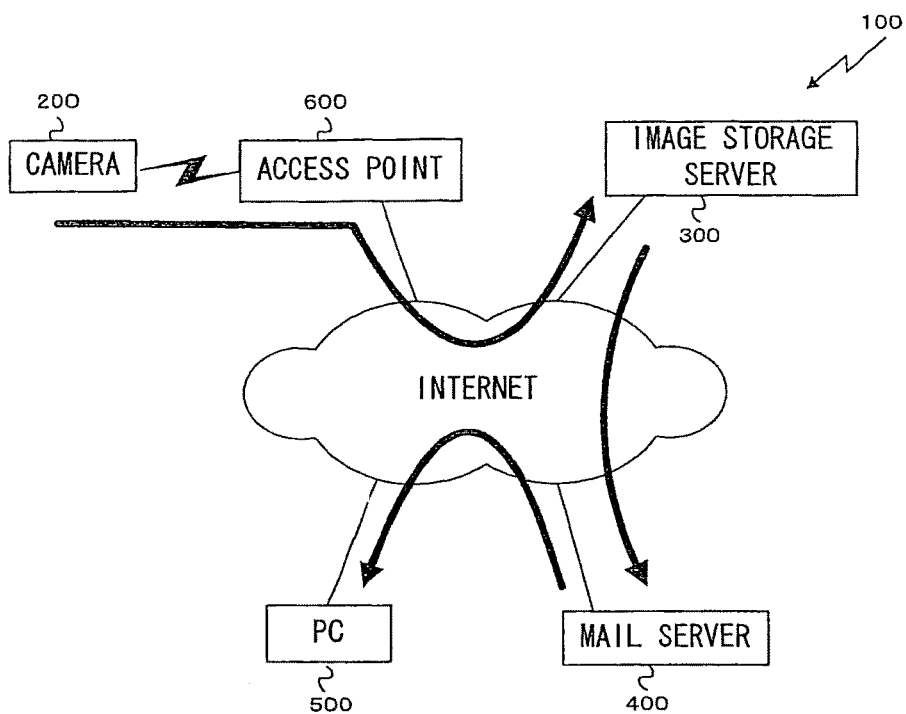
FIG. 1 is a diagram illustrating a configuration of an image transfer system according to an embodiment of the present invention.

FIG. 1 is a diagram showing the configuration of an image transfer system according to an embodiment of the present invention. An image transfer system 100 includes a camera 200, an image storage server 300, a mail server 400, a personal computer (PC) 500, and an access point 600, which is a wireless base station. These are connected to each other through a communication network such as the Internet. FIG. 1 schematically illustrates outline actions of the image transfer system including the following three stages.

(i) An image file is uploaded from the camera 200 to the image storage server 300 through the access point 600.

(ii) An e-mail, which informs a user that the image file has been uploaded, is transmitted from the image storage server 300 to the mail server 400.

(iii) The PC 500 of the user receives the e-mail.

The camera 200 is, for example, a digital camera equipped with a function of wireless communication and it is connected to the Internet through the access point 600 of a wireless LAN. The user of the camera 200 can operate the camera 200 to acquire an image and upload the acquired image to the image storage server 300. As detailed later on, the user can correlate a destination e-mail address or addresses to each corresponding image on the camera 200. The camera 200 transmits a destination list that indicates the correlations to the image storage server 300. The details of the processing by the camera 200 are described later on.

The image storage server 300 receives the image file and the destination list transmitted by the camera 200 and stores the received image file on a storage medium such as a hard disk drive and prepares an e-mail to notify that the image file has been uploaded to the specified destination or destinations of the image based on the destination list. A specific example of the prepared notification e-mail will be described later on referring to FIG. 2. The image storage server 300 transmits the prepared notification e-mail to the mail server 400. The e-mail is delivered to a mail box of the mail server 400 according to the destination e-mail address.

The owner of the destination can receive the notification e-mail from the mail server 400 using an e-mail client program installed in the PC 500 to browse the content of the notification e-mail on a monitor of the PC 500.

Figure 2:
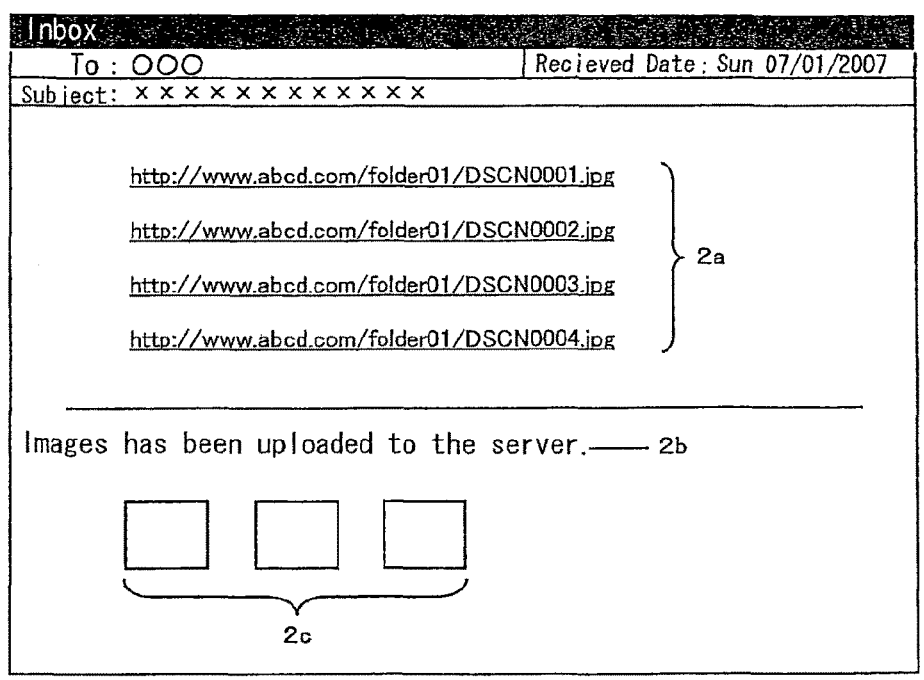
FIG. 2 is a diagram illustrating a specific example of a notification e-mail.

When the received notification e-mail is opened, there are displayed on the screen of the PC 500, as shown in, for example, FIG. 2, links 2a that provide URLs for making access to image files stored in the image storage server 300 as anchor texts, a message sentence 2b that notifies that an image has been uploaded in the image storage server 300, and thumbnail images 2c consisting of a predetermined number of frames, for example, three frames of images out of images on which a specified e-mail address. An addressee of the e-mail can click the links 2a or the thumbnails 2c to download the linked image files and browse them on the screen of the PC 500.

Figure 3:
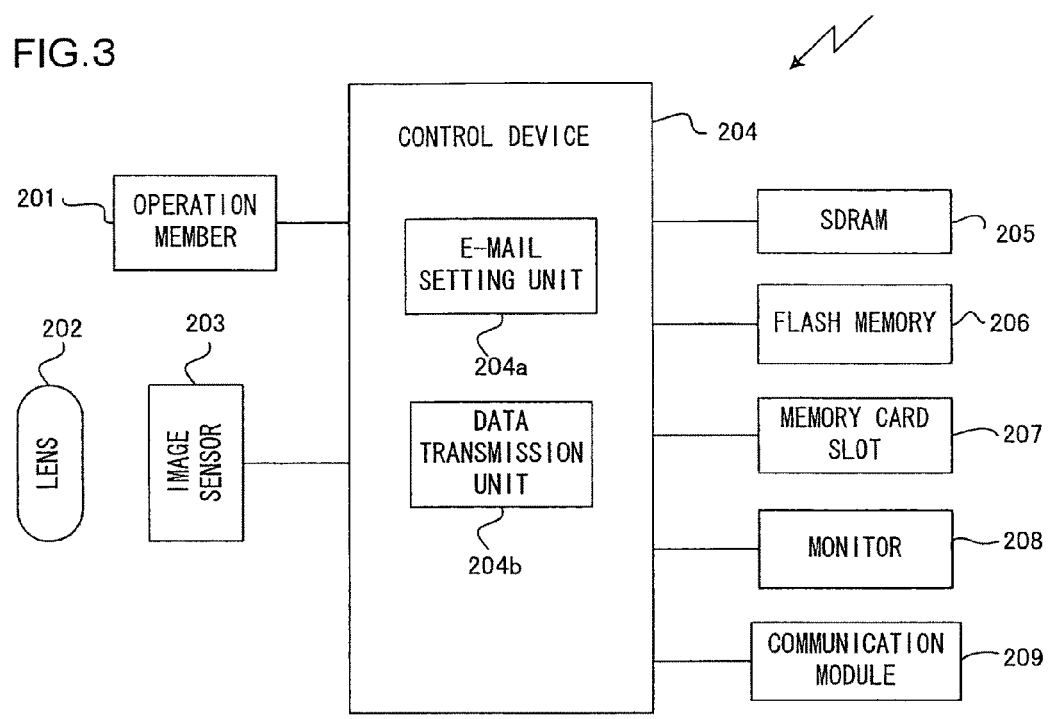
FIG. 3 is a block diagram showing the construction of the camera according to an embodiment of the present invention.

FIG. 3 is a block diagram showing the structure of the camera 200 according to an embodiment of the present invention. The camera 200 includes an operation member 201, a lens 202, an image sensor 203, a control device 204, an SDRAM 205, a flush memory 206, a memory card slot 207, a monitor 208, and a communication module 209.

The operation member 201 includes various inputting members to be operated by a user, for example, a power button, a release button, zoom buttons (a zoom up button and a zoom down button), a rotary multi-selector, a replay button, a deletion button, and a mail setting button.

Figure 4:
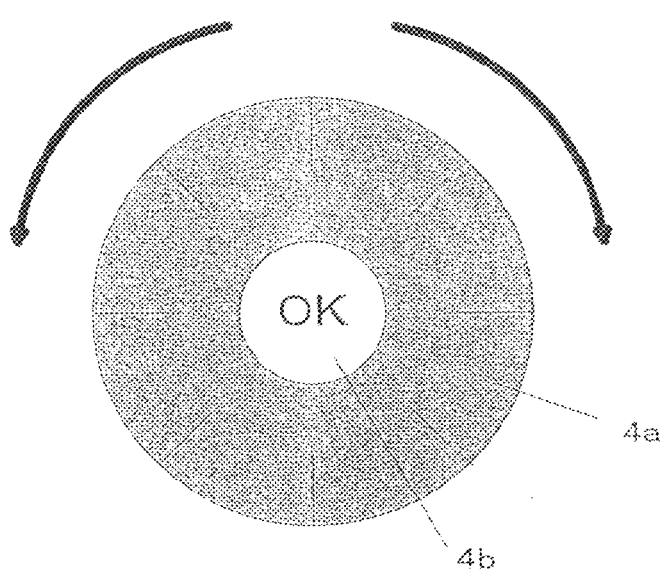
FIG. 4 is a schematic diagram illustrating a rotary multi-selector.

The rotary multi-selector is constituted, for example, by a rotation section 4a and an OK button 4b in the center as shown in FIG. 4. The user can select an item or an image by rotating the rotation section 4a rightward (clockwise) or leftward (counterclockwise), or treating the rotation section 4a like a 4-way directional pad button and pressing any one of upper, lower, left, and right portions thereof. The selected item can be fixed by pressing down the OK button 4b.

In the present embodiment, to turn the rotation section 4a rightward is expressed as "to turn the multi-selector to the right" and to turn the rotation section 4a leftward is expressed as "to turn the multi-selector to the left". To press down an upper part of the rotation section 4a is expressed as "to press the upper part of the rotary multi-selector", and to press down a lower part of the rotation section 4a is expressed as "to press the lower part of the rotary multi-selector". Similarly, to press down a left part of the rotation section 4a is expressed as "to press the left part of the rotary multi-selector", and to press down a right part of the rotation section 4a is expressed as "to press the right part of the rotary multi-selector".

While the lens 202 is constituted by a plurality of optical lenses, it is represented by a single lens in FIG. 3. The image sensor 203, which is, for example, a CCD or a CMOS, captures an image of a subject formed by the lens 202 to acquire image data. The acquired image data are output to the control device 204.

The control device 204 is constituted by a CPU and other peripheral circuits, and performs image processing on the image data input from the image sensor 203 using the SDRAM 205 to be detailed later on as a working area. For example, after image data are subjected to gradation correction processing and color conversion processing, the processed image data are compressed into a predetermined image format, for example, a JPEG format to create an image file of a predetermined format such as Exif (Exchangeable Image File Format for Digital Still Camera). Then, the created image file is output to the memory card slot 207 to be detailed later on.

The SDRAM 205, which is a volatile memory, is used as a work memory for expanding a program when the CPU executes the program or as a buffer memory for temporarily storing data. The flash memory 206, which is a nonvolatile memory, stores therein data of a program that is executed by the CPU and various parameters to be read in upon execution of the program and the like data.

The memory card slot 207 is a slot in which a memory card, which is a detachable storage medium, for example, an SD card is inserted, and writes the image file output from the control device 204 into a memory card to store it as mentioned above. The memory card slot reads out the image file stored in the memory card and output it to the control device or delete the image file stored according to the instruction from the control device 204.

The monitor 208 is a liquid crystal monitor mounted on the rear side of the camera 200 and displays various types of information such as images stored in the memory card and a menu for setting the camera 200. The control device 204 outputs images that are acquired by the image sensor 203 in chronological order as frames to the monitor 208. The monitor 208 displays each frame in chronological order at a predetermined time interval to constitute a video.

The communication module 209 is a wireless LAN module through which the camera 200 performs wireless communication with the access point 600. The communication module 209 is controlled by the control device 204. When start of communication is instructed by the user, the communication module 209 establishes wireless communication with the access point 600 to connect to the Internet through the access point 600. Processing to start wireless communication with the access point 600 will be described later on.

Hereinafter, the processing by the control device 204 according to the present embodiment is described. The control device 204 functionally includes an e-mail setting unit 204a and a data transmission unit 204b.

Figure 5:
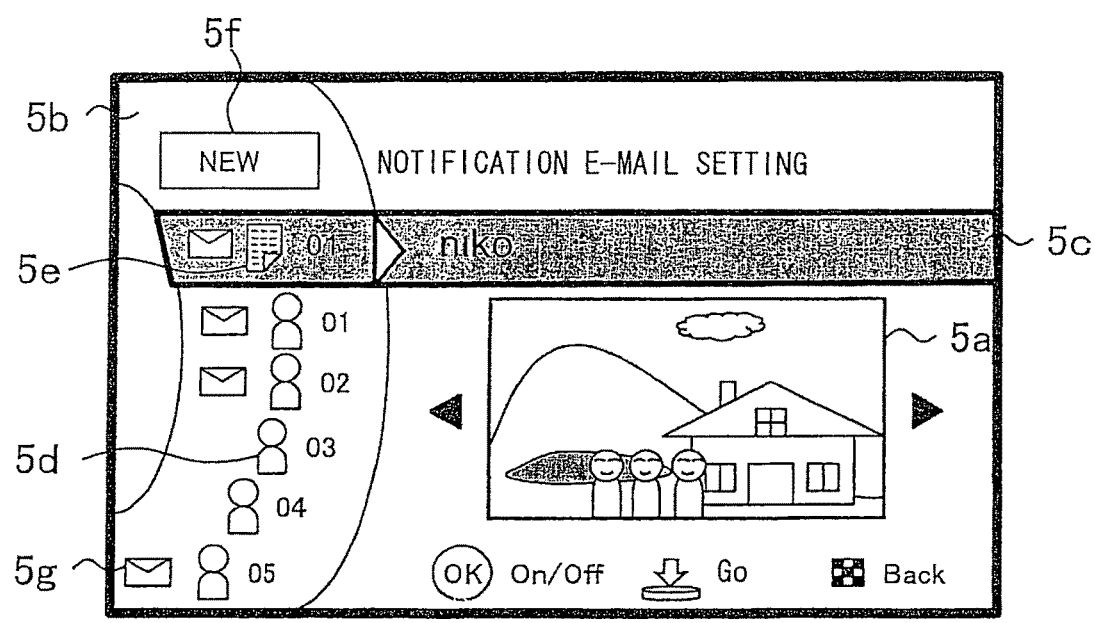
FIG. 5 is a diagram showing a specific example of an e-mail setting screen.

The e-mail setting unit 204a displays an e-mail setting screen shown in FIG. 5 on the monitor 208 when the mode of the camera 200 is changed to an e-mail setting mode according to an operation on menu by the user. The e-mail setting mode is a mode in which the user sets destination of the above-mentioned notification e-mail on an image selected by the user to be shown to other persons. The user can change the mode of the camera 200 to the e-mail setting mode by pressing down the mail setting button contained in the operation member 201 when the above-mentioned video is displayed on the monitor 208 or an image stored in the memory card is displayed on the monitor 208.

The e-mail setting screen includes an image displaying area 5a, a destination setting displaying area 5b, and a destination information displaying area 5c. The image displaying area 5a is an area for displaying one or more images stored in the memory card. The e-mail setting unit 204a displays any one of image frames in the image file read in from the memory card. For example, it initially displays an uppermost image when images are arranged in ascending order. The user can switch the image displayed in the image displaying area 5a from the currently displayed image to the image of a next order by pressing the right part of the rotary multi-selector. Also, the user can switch the image displayed in the image displaying area 5a from the currently displayed image to the image displayed immediately before by pressing the left side of the rotary multi-selector.

The destination setting displaying area 5b is an area for displaying destination setting status containing addresses to which the user is to notify that the image displayed in the image displaying area 5a has been uploaded. The e-mail setting unit 204a reads in data in an address book in which destination information has been stored in advance by the user from the flash memory 206 and displays icon representing the destination information in the destination setting displaying area 5b. The destination information includes, for example, an e-mail address and a group consisting of a plurality of e-mail addresses.

In an example shown in FIG. 5, there are displayed an icon 5d representing an e-mail address and an address number assigned to the e-mail address (for example, 01, 02, . . . ), or an icon 5e representing a group and a group number assigned to the group (for example, 01). In the destination setting displaying area 5b, there are displayed a NEW item icon 5f to be selected by the user in order to instruct new registration of an e-mail address or a group to the address book and a destination setting completion icon 5g to be detailed later on.

The icon 5d and the address number, the icon 5e and the group number, the destination setting completion icon 5g detailed later on, and the NEW item icon 5f displayed in the destination setting displaying area 5b are displayed such that their position slides to the up or down when the user turns the rotary multi-selector the right or left, respectively. The icon and the number displayed on the left side of the destination information displaying area 5c represent the currently selected destination information and the content of the destination information is displayed in the destination information displaying area 5c. In the example shown in FIG. 5, a group 01 is currently selected and a group name (niko) assigned to the group is displayed in the destination information displaying area 5c. The user can switch the destination information under selection by turning the rotary multi-selector to the right or left.

When the rotary multi-selector is turned to the left in a state in which the group 01 is selected as shown in FIG. 5, the destination information currently selected is switched to the address 01 and name and e-mail address of the owner of the address are displayed in the destination information displaying area 5c. When the user wants to set the destination information currently selected in the destination displaying area 5b to be set as the destination of a notification e-mail on the image displayed in the image displaying area 5a, the user presses down the OK button 4b of the rotary multi-selector. This enables the user to set the destination of the notification e-mail on each image on the e-mail setting screen.

In the present embodiment, the user can set destinations of the notification e-mail for each of a plurality of images while switching the image displayed on the image displaying area 5a to another one. Also, it may be configured such that for one image displayed on the image displaying area 5a, one or more e-mail addresses are selected from the destination information displayed in the destination setting displaying area 5b and the selected one or more e-mail addresses are set as a destination or destinations of the notification e-mail. It may be configured such that a group is set as a destination of a notification e-mail and the notification e-mail is transmitted to all of the e-mail addresses contained in the group.

When the destination of the notification e-mail is set for an image by the user, the e-mail setting unit 204a registers the image and the destination in relation to each other in an e-mail notification target image list. The e-mail notification target image list is a list for use in administrating images and destinations set therefor in relation to each other. The data file of the list is stored in the flash memory 206. For example, as shown in FIG. 6, the e-mail notification target image list administers a file name of image file on which destination of the notification e-mail is set, a destination ID for identifying the set destination, and time and date of transmission completion of the image file on which the destination list prepared based on the e-mail notification target image list is transmitted to the image storage server 300 in relation to each other.

The destination ID is an ID for uniquely identifying the e-mail address or group registered in the address book. In the e-mail notification target image list, the image files and the destinations are related to each other using the destination IDs. As for the data of time and date of transmission completion, the time and date of transmission of the image file and the destination list to the image storage server 300 are registered by the data transmission processing to be detailed later on. Before completion of the transmission, nothing is registered.

In the example shown in FIG. 6, records on five image files DSCN0001.jpg through DSCN0005.jpg are registered in the e-mail notification target image list but no data on the time and date of transmission completion for any image file is recorded. This indicates that the image file and the destination list have not yet been transmitted to the image storage server 300 for all the images. In the present embodiment, there is assigned an e-mail address as a destination ID starting with A in the first digit. IDs that start with G in the first digit are assigned to groups. The e-mail notification target image list shown in FIG. 6 indicates that e-mail addresses having destination IDs A01 and A02, respectively, and the group having destination ID G01 are set for DSCN0001.jpg.

The e-mail setting unit 204*a* displays the destination setting completion icon 5*g* in the destination setting displaying area 5*b* based on the e-mail notification target image list. For example, the e-mail setting unit 204*a* specifies an e-mail address or a group set as a destination for the image currently displayed in the image displaying area 5*a*. In relation to the icon 5*d* or 5*e* representing the specified e-mail address or group, respectively, the destination setting completion icon 5*g*, which indicates that the e-mail address or the group is set as a destination for an image displayed in the image displaying area 5*a*, is displayed. With the displayed icon 5*g*, the user can confirm the destination set for the image displayed in the image displaying area 5*a*.

The e-mail setting unit 204*a* is configured to use different display formats between the destination setting completion icon 5*g* for an image file on which data of time and data of transmission completion has not been registered in the e-mail notification target image list and the destination setting completion icon 5*g* for an image file on which data of time and date of transmission completion has been registered. For example, a display color for the destination setting completion icon 5*g* for the image file on which no data of time and date of transmission completion has been registered is set white. On the other hand, a display color for the destination setting completion icon 5*g* for the image file on which data of time and date of transmission completion has been registered is set red. The user can confirm whether or not the transmission of image file and destination list has been completed for each destination according to the display color of the icon 5*g*.

On the e-mail setting screen, the user can newly register an e-mail address or a group that the user wants to designate as a destination in the address book. In order to instruct new registration of e-mail address or group to be made in the address book, the user operates the rotary multi-selector to locate the NEW item icon 5*f* on the left of the destination information displaying area 5*c* and selects the NEW item icon 5*f* by pressing down the OK button 4*b*. The e-mail setting unit 204*a* displays a new registration screen on the monitor 208 and additionally registers the designated e-mail address or group in the address book according to the operation by the user.

Figure 7:
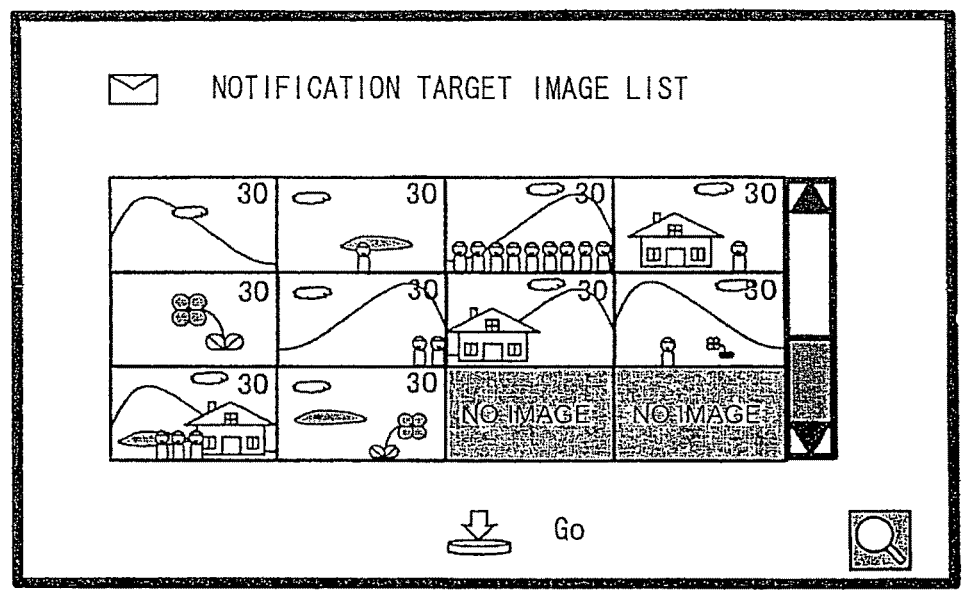
FIG. 7 is a diagram showing a specific example of a notification target image list screen.

In the present embodiment, the user can confirm setting status of destination, that is, setting status of notification e-mail on each image on the monitor 208. For example, the user presses down a zoom down button in a state in which the e-mail setting screen is displayed to display a notification target image list screen as shown in FIG. 7. That is, the e-mail setting unit 204*a* displays the notification target image list screen shown in FIG. 7 on the monitor 208 when it is detected that the zoom down button is pressed down by the user while the e-mail setting screen is being displayed.

On the notification target image list screen, the e-mail setting unit 204*a* extracts only those images for which the user has set destinations based on the above-mentioned e-mail notification target image list and displays a list of the extracted images. The e-mail setting unit 204*a* calculates the number of destinations set for each image and displays the result of the calculation in relation to each image. FIG. 7 shows an example in which 30 destinations have been set for each image. The e-mail setting unit 204*a* may be configured to determine whether or not transmission of the image file and the destination list to the image storage server 300 has been completed according to the e-mail notification target image list and to use different display formats corresponding to the number of destinations to be displayed in relation to each image. For example, for an image of which transmission to the image storage server 300 has not been completed, the number of destinations is displayed with a black figure whereas for an image of which transmission to the image storage server 300 has been completed, the number of destinations is displayed with a red figure.

When it is detected that the user has selected a frame of image on the notification target image list screen and pressed down the zoom up button, the e-mail setting unit 204*a* displays a list of the destinations set for the image on the monitor 208 referring to the e-mail notification target image list and the address book.

With the above-mentioned operation, all the setting of destinations for the image for which it is desired to transmit a notification e-mail is completed and the e-mail setting screen or the notification target image list screen is displayed on the monitor 208. In this state, when it is detected by the e-mail setting unit 204*a* that the user has pressed down the release button, the display of the e-mail setting screen or the notification target image list screen is ended to end the e-mail setting mode.

When the e-mail setting mode is ended, the e-mail setting unit 204*a* displays on the monitor 208 a message to confirm to the user whether or not it is necessary to transmit to the image storage server 300 the image for which the notification e-mail is set to be transmitted by the above-mentioned operation and the destination list that relates the image and the destination or destinations to each other. When it is instructed by the user to transmit the above, the data transmission unit 204*b* performs data transmission processing to be detailed later on whereas when it is instructed by the user not to transmit the above, the data transmission unit 204*b* does not perform data transmission processing.

Figure 8:
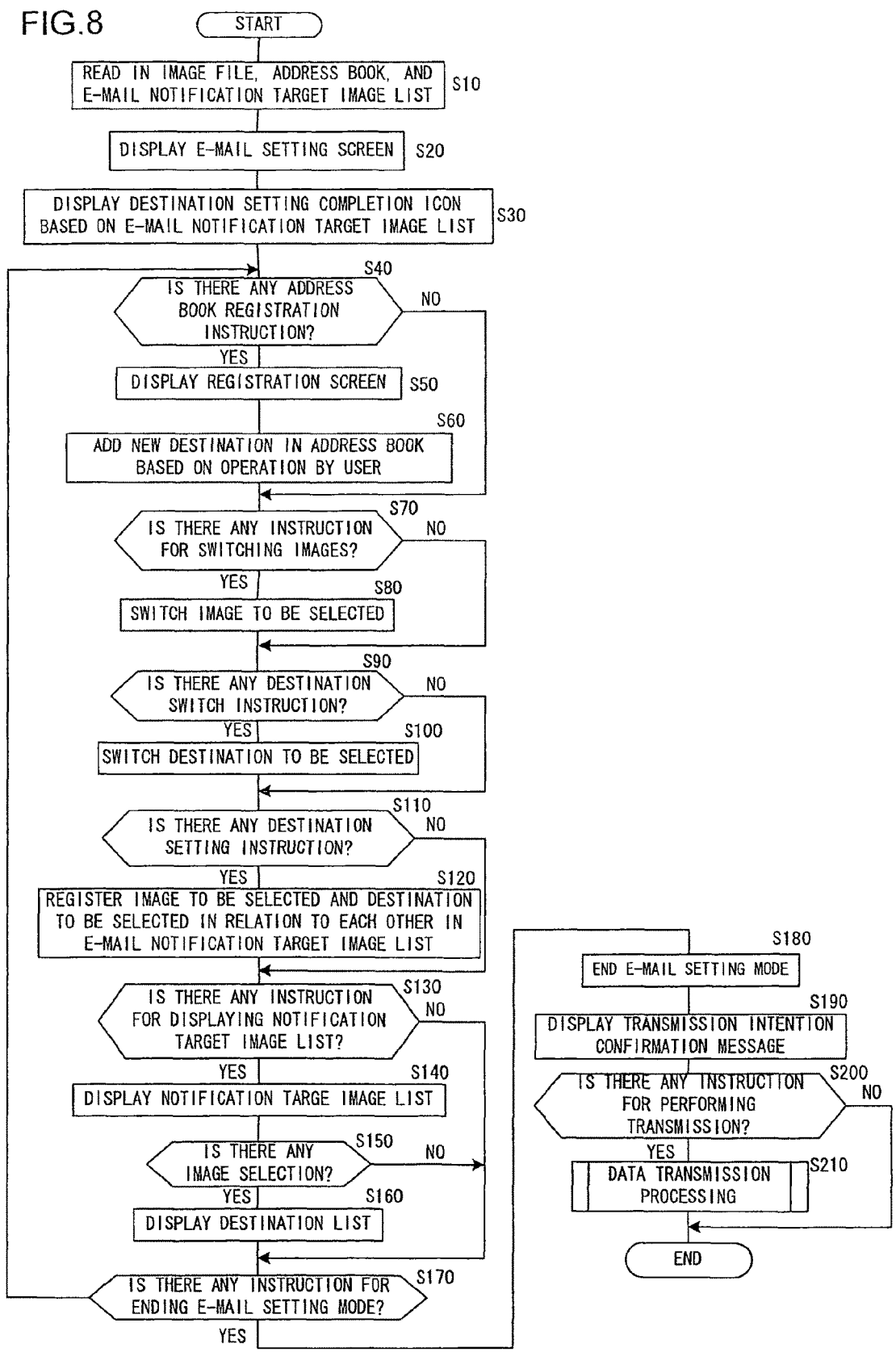
FIG. 8 is a flowchart illustrating e-mail setting processing.

FIG. 8 is a flowchart illustrating e-mail setting processing performed by the e-mail setting unit 204*a* according to the present embodiment. The processing illustrated in FIG. 8 is performed according to a program that is started up when the mode of the camera 200 is converted into an e-mail setting mode based on the operation of the menu by the user.

In a step S10, the e-mail setting unit 204*a* reads in an image file from the memory card and an address book and an e-mail notification target image list from the flash memory 206. In a step S20, the e-mail setting unit 204*a* displays the e-mail setting screen shown in FIG. 5 on the monitor 208 based on the information read in the step S10. In a step S30, the e-mail setting unit 204*a* displays the destination setting completion icon 5g in the destination setting displaying area 5b referring to the e-mail notification target image list.

In a step S40, the e-mail setting unit 204a determines whether or not new registration in the address book has been instructed by selection of the NEW item icon 5f by the user as mentioned above. If the result of the determination in the step S40 is NO, the process is advanced to a step S70 to be detailed later on. If the result of the determination in the step S40 is YES, the process is advanced to a step S50. In the step S50, the e-mail setting unit 204a displays a registration screen of a new destination on the monitor 208 and receives registration of the new destination by the user. In a step S60, the e-mail setting unit 204a adds the new destination in the address book according to the operation by the user.

In the step S70, the e-mail setting unit 204a determines whether or not it has been instructed to switch the image to be displayed in the image displaying area 5a by pressing down of the right or left part of the rotary multi-selector by the user. If the result of the determination in the step S70 is NO, the process is advanced to a step S90. If the result of the determination in the step S70 is YES, the process is advanced to a step S80. In the step S80, the e-mail setting unit 204a switches the image to be displayed in the image displaying area 5a according to the operation of the rotary multi-selector by the user.

In the step S90, the e-mail setting unit 204a determines whether or not it has been instructed to switch the destination to be selected in the destination setting displaying area 5b by turning the rotary multi-selector to the right or left by the user. If the result of the determination in the step S90 is NO, the process is advanced to a step S110 to be detailed later on. If the result of the determination in the step S90 is YES, the process is advanced to a step S100. In the step S100, the e-mail setting unit 204a switches the destination to be selected according to the operation of the rotary multi-selector by the user.

In the step S110, the e-mail setting unit 204a determines whether or not it has been instructed to set the destination selected in the destination setting displaying area 5b for the image displayed in the image displaying area 5a by pressing down the OK button 4b of the rotary multi-selector by the user. If the result of the determination in the step S110 is NO, the process is advanced to a step S130 to be detained later on. If the result of the determination in the step S110 is YES, the process is advanced to a step S120. In the step S120, the e-mail setting unit 204a relates the image file of the image displayed in the image displaying area 5a and the destination ID of the destination selected in the destination setting displaying area 5b to each other and register them in the e-mail notification target image list shown in FIG. 6.

In the step S130, the e-mail setting unit 204a determines whether or not it has been instructed to display the notification target image list screen by pressing down the zoom down button by the user. If the result of the determination in the step S130 is NO, the process is advanced to a step S170 to be detailed later on. If the result of the determination in the step S130 is YES, the process is advanced to the step S140. In the step S140, the e-mail setting unit 204a displays the notification target image list screen shown in FIG. 7 on the monitor 208. On this occasion, the e-mail setting unit 204a calculates the number of destinations set for each image according to the e-mail notification target image list and displays the result of calculation in relation to each image.

In a step S150, the e-mail setting unit 204a determines whether or not it has been instructed to display an e-mail address list set for each image by selecting a frame of image on the notification target image list screen and pressing down the zoom up button by the user. If the result of the determination in the step S150 is NO, the process is advanced to a step S170. If the result of the determination in the step S150 is YES, the process is advanced to a step S160. In the step S160, the e-mail setting unit 204a displays a list of the destinations set for the image on the monitor 208 referring to the e-mail notification target image list and the address book.

In the step S170, the e-mail setting unit 204a determines whether or not it has been instructed to end the e-mail setting mode by pressing down the release button by the user while the e-mail setting screen or the notification target image list screen is being displayed. If the determination in the step S170 is NO, the process is returned to the step S40 to repeat the processing. If the result of the determination in the step S170 is YES, the process is advanced to a step S180. In the step S180, the e-mail setting unit 204a ends the e-mail setting mode.

In a step S190, the e-mail setting unit 204a displays on the monitor 208 a message to confirm to the user whether or not it is necessary to transmit to the image storage server 300 the image for which a notification e-mail is set to be transmitted and the destination list in which the image and a destination or destinations are related to each other. In a step S200, the e-mail setting unit 204a determines whether or not it has been instructed by the user to perform data transmission processing. If the result of the determination in the step S200 is YES, the process is advanced to a step S210. In the step S210, the data transmission unit 204b performs the data transmission processing to be detailed later on referring to FIG. 9 and ends the processing. If the result of the processing in the step S200 is NO, the processing is immediately ended.

Now, the data transmission processing by the data transmission unit 204b in the present embodiment is described. The data transmission unit 204b transmits the target image, and the destination list in which the file name of an image file and its destination are related to each other to the image storage server 300 based on the e-mail notification target image list when it is instructed by the user to transmit to the image storage server 300 the image for which a destination is set by the above-mentioned e-mail setting processing in order for the notification e-mail to be transmitted. The user can instruct the data transmission unit 204b to perform the data transmission processing in response to the confirmation message displayed in the step S190 in FIG. 8. Alternatively, the user can instruct the data transmission unit 204b to perform the data transmission processing by a menu operation.

Figure 9:
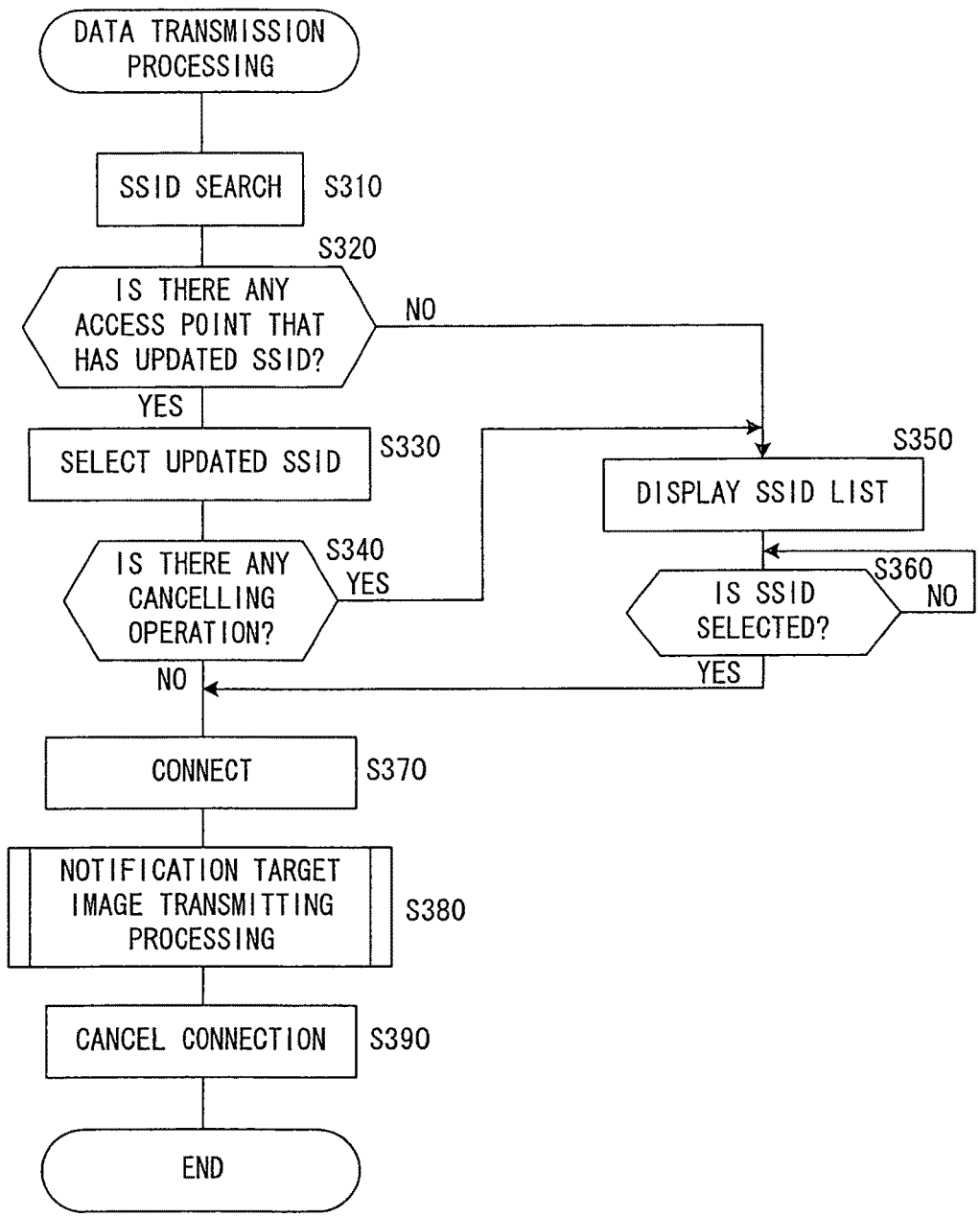
FIG. 9 is a flowchart illustrating data transmission processing according to a first embodiment of the present invention.

FIG. 9 is a flowchart illustrating the data transmission processing to be performed by the data transmission unit 204b. The processing shown in FIG. 9 is performed as a program that is started up when it is instructed to transmit the image for which destination is set by the user to the image storage server 300.

In the step S310, the data transmission unit 204b controls the communication module 209 to search an SSID of the access point 600 that is present in a range in which communication is possible. In a step S320, the data transmission unit 204b determines whether or not the access point 600 having a registered updated SSID registered in the camera 200 (updated SSID) is within a range in which communication is possible based on the result of search in the step S310. If the result of the determination in the step S320 is YES, the process is advanced to a step S330. In the step S330, the data transmission unit 204b selects the updated SSID.

In a step S340, the data transmission unit 204b determines whether or not an operation of canceling connection to the access point 600 having the selected updated SSID is performed by the user. If the result of the determination in the step S340 is NO, the process is advanced to a step S370 to be detailed later on. If the result of the determination in the step S320 is NO, or if the result of the determination in the step S340 is YES, the process is advanced to a step S350. In the step S350, the data transmission unit 204b displays a list of SSIDs already registered to the camera 200 on the monitor 208 and the process is advanced to a step S360. In the step S360, it is determined whether or not any SSID has been selected by the user. If the result of the determination in the step S360 is YES, the process is advanced to a step S370.

In the step S370, the data transmission unit 204b establishes wireless connection with the access point 600 using the updated SSID selected in the step S330 or the SSID selected by the user in the step S360. In a step S380, the data transmission unit 204b performs the notification target image transmitting processing shown in FIG. 10 to be detailed later on and the process is advanced to a step S390. In the step S390, the connection with the access point 600 is cancelled to end the processing.

Figure 10:
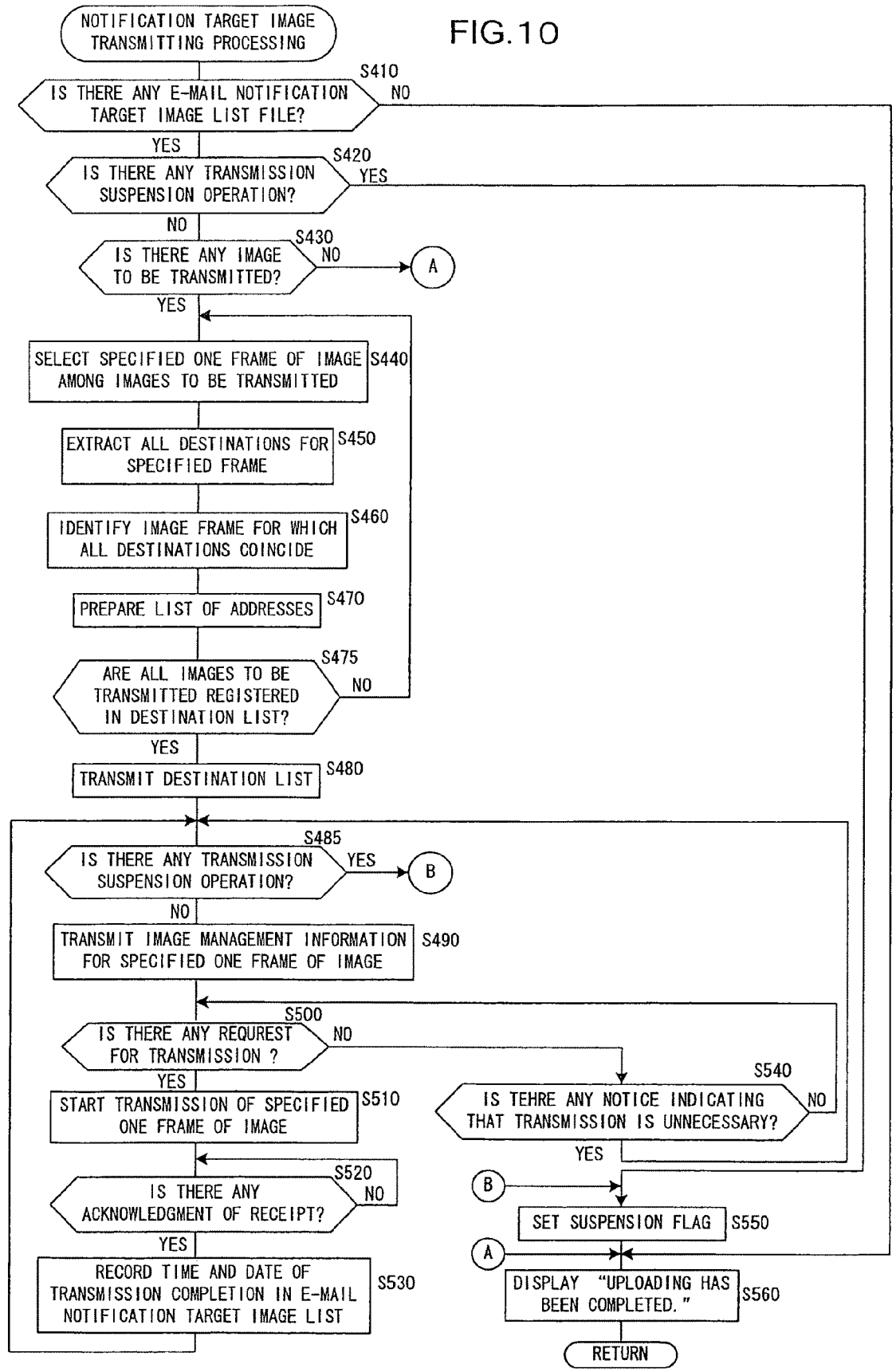
FIG. 10 is a flowchart illustrating notification target images transmission processing.

FIG. 10 is a flowchart illustrating the notification target image transmission processing performed in the step S380. In a step S410, the data transmission unit 204b determines whether or not a file of the above-mentioned e-mail notification target image list is present in the flash memory 206. If the result of the determination in the step S410 is NO, the process is advanced to a step S560. In the step S560, the data transmission unit 204b displays a message indicating that the data transmission has been completed, such as "Uploading has been completed.", on the monitor 208, and the process is returned to the processing shown in FIG. 9. If the result of the determination in the step S410 is YES, the process is advanced to a step S420.

In the step S420, the data transmission unit 204b determines whether or not an operation to suspend the data transmission is performed by the user. If the result of the determination in the step S420 is YES, the process is advanced to a step S550 to set a suspension flag to be detailed later on. The suspension flag, which is a flag indicating that the notification target image transmission processing has been suspended on the way, is stored in the SDRAM 205. The suspension flag is configured to be used in the second and third embodiments to be detailed later on and it may be omitted in the first embodiment. After the process is advanced to the above-mentioned step S560, the process is returned to the processing illustrated in FIG. 9.

If the result of the determination in the step S420 is NO, the process is advanced to a step S430. In the step S430, the data transmission unit 204b determines whether or not there is an image for which no destination list has been transmitted to the image storage server 300 based on the e-mail notification target image list, that is, an image for which data of time and date of transmission completion has not been registered in the e-mail notification target image list. If the result of the determination in the step S430 is NO, the process is advanced to the step S560 and then returned to the processing illustrated in FIG. 9. If the result of the determination in the step S430 is YES, the process is advanced to a step S440.

In the step S440, the data transmission unit 204b selects a specified frame of image from among non-transmitted images. In a step S450, the data transmission unit 204b extracts all destinations related to the specified frame of image referring to the e-mail notification target image list. In a step S460, the data transmission unit 204b specifies other images to which destinations that completely coincide with all the destinations extracted in the step s450 from among the images contained in the e-mail notification target image list.

In a step S470, the data transmission unit 204b prepares a destination list by grouping the images specified in the step S460 based on their destinations and stores the destination list in the SDRAM 205. The data transmission unit 204b instructs the image storage server 300 to transmit a notification e-mail for which image to which destination by transmitting the destination list to the image storage server 300.

When the combination of all the destinations set for each image is different, the image storage server 300 must set each combination of all the destinations as destinations, and prepare and transmit a notification e-mail for each combination. When all the destinations are identical for a plurality of images, it is sufficient to prepare a single notification e-mail for notifying that the plurality of images have been uploaded and broadcast the e-mail to all the matching destinations.

In this case, a list is prepared in which stores having all the matched destinations are grouped. FIG. 11 shows a specific example of the destination list prepared based on the e-mail notification target image list shown in FIG. 6.

In the e-mail notification target image list shown in FIG. 6, DSCN0001.jpg and DSCN0003.jpg match each other in all the destinations related thereto. Therefore, there is added in the destination list a record which is constituted by the e-mail address having a destination ID of A01, the e-mail address having a destination ID of A02, and all the e-mail addresses contained in G03 that are selected as the destinations of the notification e-mail and the notification target images to be notified by the notification e-mail including DSCN0001.jpg and DSCN0003.jpg. The other images have no matched destinations to each other, so that there are added to the destination list those records that are constituted by destinations related to each image that are used as destinations of the notification e-mail and each image as the notification target image to be notified by the notification e-mail.

In a step S475, the data transmission unit 204b determines whether or not all the non-transmitted images specified in the step S430 have been registered in the destination list. If the result of the determination in the step S475 is NO, the process is returned to the step s440. If the result of the determination in the step S430 is YES, the process is advanced to a step S480.

In the step S480, the data transmission unit 204b transmits the prepared destination list to the image storage server 300. The image storage server 300 analyses a notification e-mail for which image is to be transmitted to which destination based on the received destination list and the notification e-mails shown in FIG. 2 to their corresponding destinations, respectively.

In a step S485, the data transmission unit 204b determines whether or not an operation to suspend the data transmission has been performed by the user. If the result of the determination in the step S485 is YES, the process is advanced to the above-mentioned step S550 to set the suspension flag to be detailed later on. As mentioned above, the suspension flag is for use in the second and third embodiments, so that it does not have to be set in the first embodiment.

In a step S490, the data transmission unit 204b selects a specified frame of image and transmits image management information on the image to the image storage server 300. The image management information includes a file name of the image file, time and date of preparing the file, and a file size. In the image storage server 300, the data transmission unit 204b determines whether or not the image file scheduled to be transmitted has already been registered in the image storage server 300 based on the received image management information. When all of the file name, the time and date of preparing the file, and the file size coincide with those of the image file already registered, the result of the determination in the step S490 is YES.

In this case, the image storage server 300 determines that it is unnecessary to receive the image file from the camera 200 and notifies to the camera 200 that transmission of the image file is unnecessary. When there has been stored in the image storage server 300 no image file that has a file name, time and date of preparing the file, and a file size that match those of the received image management information, the image storage server 300 determines that it is necessary to receive the image from the camera 200 and sends a request for transmission of the file to the camera 200.

In a step S500, the data transmission unit 204b determines whether or not the request for transmission has been received from the image storage server 300. If the result of the determination in the step S500 is NO, the process is advanced to a step S540. In the step S540, the data transmission unit 204b determines whether or not it has been notified that the transmission is unnecessary from the image storage server 300. If the result of the determination in the step S540 is NO, the process is returned to the step S500 to repeat the processing. If the result of the determination in the step S540 is YES, the process is returned to the step S490.

When the result of the determination in the step S500 is YES, the process is advanced to a step S510 and the data transmission unit 204b starts transmission of the specified one frame of image selected in the step S490 to the image storage server 300. When the reception of the specified one frame of image is completed, the image storage server 300 transmits a notification of reception to the camera 200. In a step S520, the data transmission unit 204b determines whether or not the notification of reception is received from the image storage server 300. If the result of the determination in the step S520 is YES, the process is advanced to a step S530. In the step S530, the data transmission unit 204b records current time and date as time and date of transmission completion for a specified image file in the e-mail notification target image list, and the process is returned to the step S490.

According to the first embodiment described as above, the following advantages can be obtained.

(1) The control device 204 is configured to store an image file in a memory card loaded in the memory card slot 207. The e-mail setting unit 204a is configured to store an e-mail notification target image list in which file name for identifying each image file and destination IDs on destination of each image file are related to each other in the flash memory 206. The data transmission unit 204b is configured to transmit the destination list prepared based on the e-mail notification target image list and the image files specified by the e-mail notification target image list to the image storage server 300 when it is detected that the connection with the image storage server 300 through the access point 600 is established and if the e-mail notification target image list is stored in the flash memory 206. Therefore, the user can give instruction to the data transmission unit 204b in advance to perform transmission even where wireless communication is impossible and the image file that is the target of the instruction for transmission is transmitted when the wireless communication is established. This improves convenience.

(2) The e-mail setting unit 204a is configured to display an image in the image displaying area 5a on the e-mail setting screen based on the image file stored in the memory card and switch the image displayed in the image displaying area 5a in response to the instruction by the user via the rotary multi-selector. The file name of the image file corresponding to the image displayed in the image displaying area 5a based on the instruction by the user via the rotary multi-selector is related to at least one destination ID and the file name and the at least one destination ID are registered in the e-mail notification target image list. Therefore, in the destination list prepared based on the e-mail notification target image list, a plurality of images of which destination IDs match each other can be managed by a single record, so that the image storage server 300 that has received the destination list need not prepare a plurality of notification e-mails.

(3) The e-mail setting unit 204a is configured to display a list of images scheduled to be transmitted to the image storage server 300 on the notification target image list screen based on the e-mail notification target image list stored in the flash memory 206. Therefore, the user can confirm the setting status of the notification e-mail transmission whenever necessary.

(4) The e-mail setting unit 204a is configured to display the number of destinations set for each image in relation to each image displayed on the notification target image list screen. This enables the user to determine if the number of destinations is appropriate by comparing the number of destinations of each image with the number of persons on the image.

(5) The e-mail setting unit 204a is configured such that when any one of images displayed on the notification target image list screen is selected by the user, a list of e-mail addresses set for the selected image is displayed based on the e-mail notification target image list. This enables the user to check to see if there is an error in the destination of the notification e-mail on the image.

(6) The e-mail setting unit 204a is configured such that images of which transmission to the image storage server 300 has been completed and images of which transmission to the image storage server 300 has not yet been completed can be discriminated one from another by using the destination setting completion icons 5g having different displaying formats in the destination setting displaying area 5b based on the e-mail notification target image list. This enables the user to move the camera 200 to a position where it is possible to establish wireless connection between the camera 200 and the access point 600 when it is recognized that there is an image of which transmission has not been completed yet in order to complete the transmission of the image.

Second Embodiment

In the second embodiment, when it is instructed by the user to create a back up copy of the image file in the image storage server 300, the image for which it is set to transmit a notification e-mail and a destination list together with the image file to be backed up are transmitted to the image storage server 300.

In the second embodiment, descriptions referring to FIGS. 1 to 8, 10, and 11 are the same as those in the first embodiment, and the descriptions thereof are omitted. The user is supposed to perform operations to transmit the notification e-mail in advance using the e-mail setting screen in the same manner as that in the first embodiment, and it is assumed that the e-mail notification target image list has already been prepared in the flash memory 206.

It is highly possible that there are many image files to be backed up and the amount of data thereof is large. On the other hand, it is also highly possible that there are rather a small number of image files to which notification e-mail is to be transmitted. For this reason, if the image files to be backed up are transmitted first, it will take a long time before the transmission of image files to which the notification e-mail is to be transmitted is started, so that the images files to which the notification e-mail is to be transmitted can not be transferred efficiently.

Therefore, in the present embodiment, the image files to which the notification e-mail is to be transmitted can be efficiently transmitted by transmitting them in priority to the image files to be backed up. The data transmission unit 204b identifies the image files for which it is set by the user to transmit the notification e-mail as specified images and the other image files to be backed up as non-specified images. The specified images are transmitted to the image storage server 300 in priority to the non-specified images.

Figure 12:
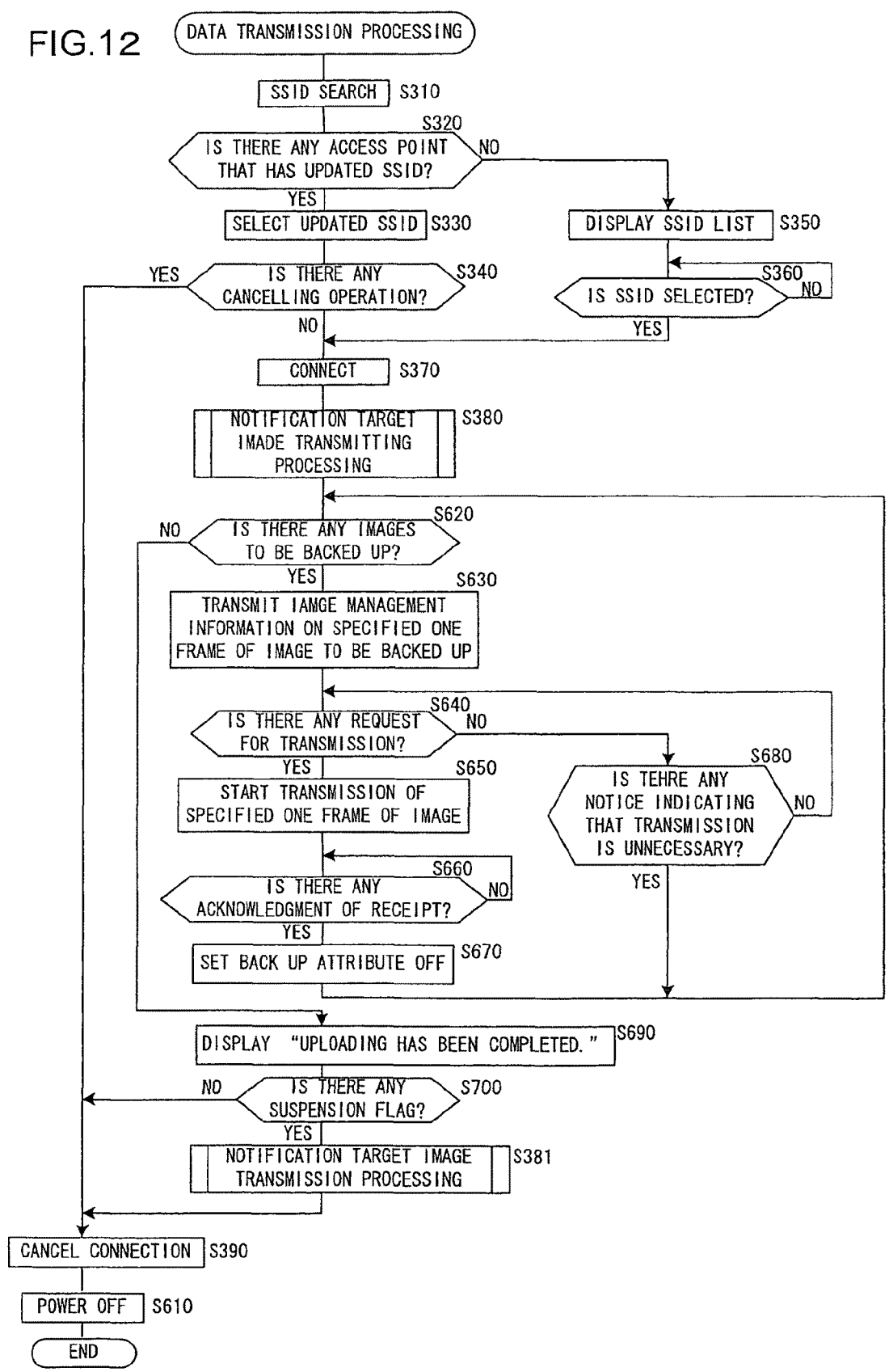
FIG. 12 is a flowchart illustrating data transmission processing according to a second embodiment of the present invention.

To be concrete, the data transmission unit 204b performs data transmission processing shown in FIG. 12. The processing shown in FIG. 12 is executed by a program that is started up when it is instructed by the user to back up images in the image storage server 300. Alternatively, the processing is executed by a program that is started up when power is supplied to the camera 200 from an external power source through an AC adapter. In FIG. 12, the same step numbers are assigned to the same processing as the data transmission process in the first embodiment explained referring to FIG. 9, and explanation is focused on differences.

If the result of the determination in the step S340 is YES, the process is advanced to a step S390. In the step S390, the data transmission unit 204b cancels connection with the access point 600. In a step S610, the data transmission unit 204b turns the power of the camera 200 OFF to end the processing.

In a step S620, the data transmission unit 204b determines whether or not there is in the memory card an image file to be backed up of which transmission to the image storage server 300 has not been completed. To be concrete, the data transmission unit 204b determines that an image file on which a back up attribute is set ON is determined to have not been completed of backing up. If the result of the determination in the step S620 is YES, the process is advanced to a step S630. In the step S630, the data transmission unit 204b transmits image management information, that is, file name, time and date of preparing, and file size of one specified frame of image out of those images whose backing up has not been completed to the image storage server 300.

In a step S640, the data transmission unit 204b determines whether or not it receives a request to transmit data from the image storage server 300. If the result of the determination in the step S640 is NO, the process is advanced to a step S680 and the data transmission unit 204b determines whether or not it has been notified from the image storage server 300 that transmission is unnecessary. If the result of the determination in the step S680 is NO, the process is returned to the step S640 to repeat the processing. If the result of the determination in the step S680 is YES, the process is returned to the step S620.

If the result of the determination in the step S640 is YES, the process is advanced to a step S650 and transmission of the specified one frame of image selected in the step S630 to the image storage server 300 is started. In a step S660, the data transmission unit 204b determines whether or not an acknowledgment of receipt has been received from the image storage server 300. If the result of the determination in the step S660 is YES, the process is advanced to a step S670 and the data transmission unit 204b sets OFF the back up attribute of the transmitted specified one frame of image file.

If the result of the determination in the step S660 is NO, the process is advanced to a step S690. In the step S690, the data transmission unit 204b displays a message indicating that the transmission of the image file to which the notification e-mail is to be transmitted, the destination list, and the image file to be backed up has been completed, such as "Uploading has been completed.", on the monitor 208.

In a step S700, the data transmission unit 204b determines whether or not the suspension flag set by the notification target image transmission processing explained referring to FIG. 10 is stored in the SDRAM 205. If the result of the determination in the step S700 is NO, the process is advanced to the step S390. If the result of the determination in the step S700 is YES, the process is advanced to the step S381 to perform the notification target image transmission processing again.

According to the second embodiment as mentioned above, in addition to the advantages of the first embodiment, the following advantages can be obtained.

(1) The data transmission unit 204b specifies an image file for which a notification e-mail is set by the user to be transmitted out of a plurality of image files stored in the memory card based on the e-mail notification target image list registered by the e-mail setting unit 204a. Upon transmission of a plurality of image files stored in the memory card to the image storage server 300, the data transmission unit 204b transmits the specified image files as mentioned above in priority to non-specified image files to the image storage server 300. This enables the specified image files to be transmitted to the image storage server 300 efficiently, so that the notification e-mail can be transmitted from the image storage server 300 while the non-specified image files are being transmitted to the image storage server 300.

(2) The data transmission unit 204b is configured such that when the data transmission unit 204b has suspended transmission of the specified image files registered in the e-mail notification target image list based on the instruction by the user, the data transmission unit 204b starts transmission of non-specified image files to be backed up. This enables the user to achieve effective utilization of spare time by performing uploading of the non-specified image files to the image storage server 300 preferentially when the user must temporarily suspend the transmission of the notification e-mail notifying that the specified image files have been uploaded to the image storage server 300.

(3) The data transmission unit 204b is configured such that when the transmission of the specified image files is suspended and the non-specified image files are transmitted to the image storage server 300, the data transmission unit 204b resumes transmission of the specified image files after completion of the transmission of the non-specified image files. This prevents the notification e-mail from being left non-transmitted because of the user's forgetting resuming the transmission of the specified file images during transmission of the non-specified image files to the image storage server 300 over a long time.

Third Embodiment

In a third embodiment of the present invention, explanation is made on a process in which when an image to be transmitted to the image storage server 300 has been selected in advance by the user in order to create a back up copy of the image, image files on which a notification e-mail is to be transmitted are transmitted in priority to the selected image files. The data transmission unit 204b identifies the image files on which the notification e-mail is set by the user to be transmitted as specified images and the image files selected by the user in advance as non-specified images. The specified images are transmitted to the image storage server 300 in priority to the non-specified images.

In the third embodiment, descriptions referring to FIGS. 1 to 8, 10, and 11 are the same as those in the first embodiment, and explanation thereof is omitted. The user is supposed to perform operations to transmit the notification e-mail in advance using the e-mail setting screen in the same manner as that in the first embodiment, and it is assumed that the e-mail notification target image list has already been prepared in the flash memory 206. It is also assumed that the images to be transmitted to the image storage server 300 have already been selected by the user and a list of file names of the image files has already been stored as transmission target list in the flash memory 206.

Figure 13:
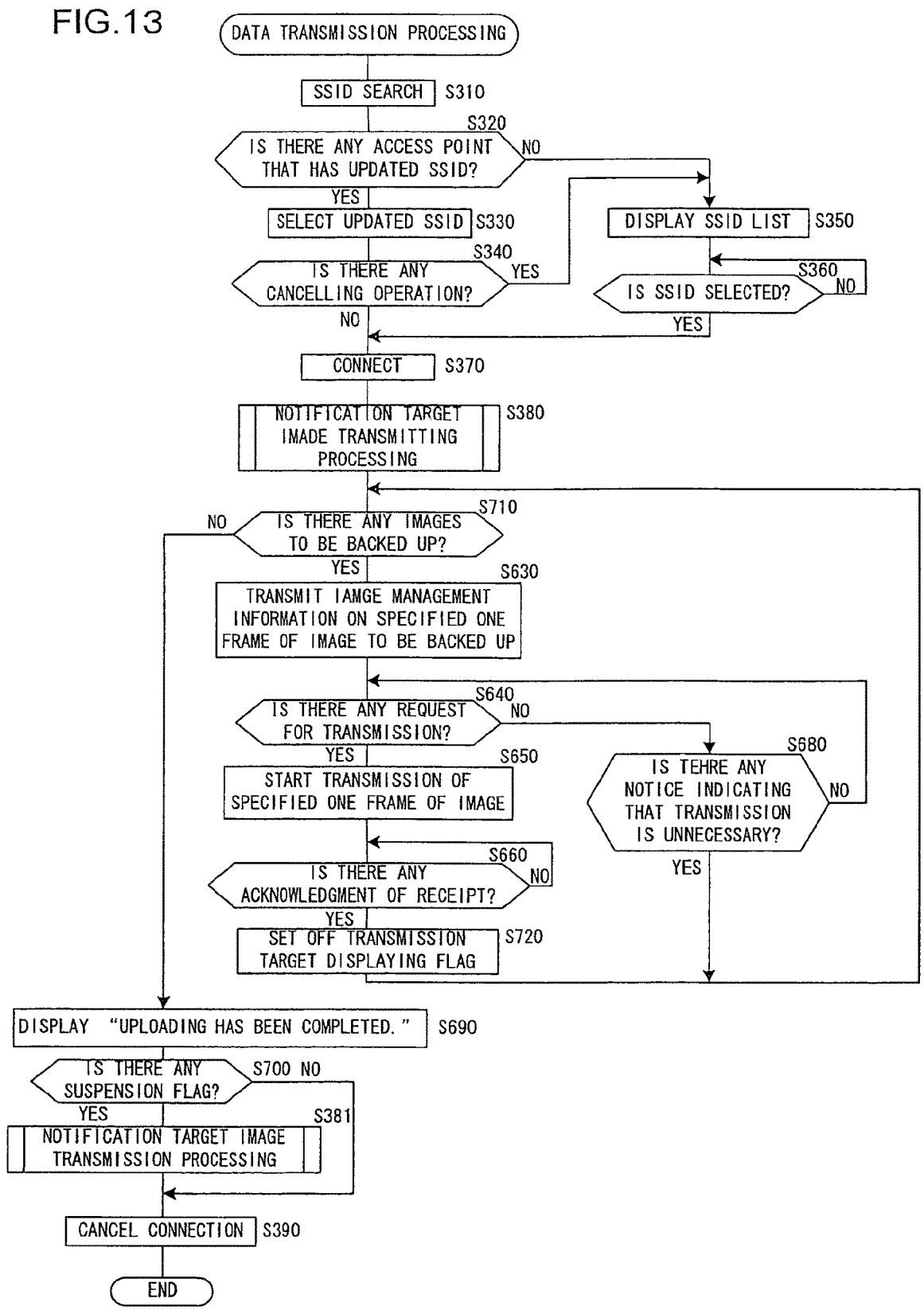
FIG. 13 is a flowchart illustrating data transmission processing according to a third embodiment of the present invention.

FIG. 13 is a flowchart illustrating data transmission processing according to the third embodiment. The processing illustrated in FIG. 13 is executed by a program that is started up when it is instructed by the user to transmit an image to the image storage server 300. In FIG. 13, the same step numbers are assigned to the same processing as the data transmission process in the first embodiment explained referring to FIG. 9 and the same processing as the data transmission process in the second embodiment explained referring to FIG. 12 and explanation is focused on differences.

In a step S710, the data transmission unit 204b determines whether or not there is in the memory card an image file of which transmission to the image storage server 300 in order to create a back up copy of the image file has not been completed. If the result of the determination in the step S710 is YES, the process is advanced to the step S630 and if the result of the determination in the step S710 is NO, the process is advanced to the step S690.

In the step S660, the data transmission unit 204b determines whether or not an acknowledgment of receipt has been received from the image storage server 300. If the result of the determination in the step S660 is YES, the process is advanced to a step S720. The data transmission unit 204b sets OFF a transmission target displaying flag of the transmitted specified one frame of image file.

According to the third embodiment as mentioned above, in addition to the advantages of the first embodiment, the following advantages can be obtained. The data transmission unit 204b is configured to transmit image files for which a notification e-mail is to be transmitted to the image storage server 300 in priority to image files which it is set in advance by the user to transmit to the image storage server 300. It may also be configured such that subsequently, the notification e-mail is transmitted from the image storage server 300 while the image files set to be transmitted to the image storage server 300 are being transmitted to the image storage server 300.

—Variation—

The image transfer systems according to the above-mentioned embodiments can be modified as follows.

(1) In the first to the third embodiments mentioned above, image files are stored in the memory card loaded in the memory card slot 207 and the e-mail notification target image list is stored in the flash memory 206. Since the image file and the e-mail notification target image list are stored in different storage media from each other, the image file and the e-mail notification target image list can be correlated to each other by storing the information, which is for identifying image files for which a notification e-mail is to be transmitted, to be stored in the flash memory 206 in the memory card loaded in the memory card slot 207. However, for example, it would also be acceptable to store the image file and the e-mail notification target image list in the same memory card or flash memory. In addition, the circuit or device for storing image files in a storage medium and the circuit or device for storing the e-mail notification target image list in a storage medium may be physically the same as or different.

(2) In the first to the third embodiments mentioned above, explanation has been made on the example in which the data transmission unit 204b prepares a destination list based on the e-mail notification target image list and transmits the destination list to the image storage server 300. However, the data transmission unit 204b may be configured to transmit the e-mail notification target image list itself to the image storage server 300 without preparing destination lists. Although destination IDs are registered in the e-mail notification target image list shown in FIG. 6, no actual e-mail address is registered. In such a case, it is necessary to register actual e-mail addresses in place of destination IDs in the e-mail notification target image list.

(3) In the second and the third embodiments mentioned above, explanation has been made on the example in which it is configured such that images for which it is set by the user to transmit the notification e-mail, that is, images which are related to destinations in the e-mail notification target image list are identified as specified images and the other images stored in the memory card are identified as non-specified images, and the specified images are transmitted to the image storage server 300 in priority to the non-specified images. However, it may also be configured such that the user can freely set priority in transmitting the specified file and the non-specified file to the image storage server 300 by a menu operation on the display screen on the monitor 208 in the camera 200. This enables the user to set such that the specified images are transmitted in priority to the non-specified images, or in reverse, such that the non-image files are transmitted in priorities to the specified images.

(4) In the first to the third embodiments mentioned above, explanation has been made on the example in which the camera 200 includes the communication module 209. However, the communication module 209 may be configured to be detachably attached to the camera 200. For example, the camera 200 may be configured to perform wireless communication through USB connection to an external wireless device equipped with the communication module 209. Alternatively, the camera 200 may be provided with a slot for inserting a wireless communication card and may perform wireless communication through the wireless communication card inserted in the slot.

(5) In the first embodiment mentioned above, explanation has been made on the example in which the e-mail setting unit 204a is configured such that when the e-mail setting unit 204a detects, while the e-mail setting screen is being displayed, that the zoom down button has been pressed down by the user, it displays the notification target image list screen shown in FIG. 7 on the monitor 208. By changing the display format of the number of destinations to be displayed in correlation to each image, the status of transmission completion or non-completion of the image file and destination list to the image storage server 300 is represented. However, the e-mail setting unit 204a may be configured to accept on the notification target image list screen retransmission of the image file and destination list for which transmission of the image file and the destination list to the image storage server 300 has already been completed.

For example, the user may operate the rotary multi-selector to select an image to be retransmitted on the notification target image list screen and press down the OK button 4a to instruct retransmission of the image file of the image and the destination list to be performed. The data transmission unit 204b deletes data of time and date of transmission completion corresponding to the image file in the e-mail notification target image list. This enables the data transmission unit 204*b* to manage the transmission of the image file and the destination list to the image storage server 300 as being in a non-completed state. The data transmission unit 204*b* can retransmit the image file and the destination list to the image storage server 300.

(6) In the second embodiment mentioned above, the data transmission unit 204*b* is configured to transmit the image files to be backed up to the image storage server 300. However, the device that stores the image files to be backed up may be an external device that is connectable to the camera 200, for example, a personal computer or a photo storage device for storing image files.

(7) In the third embodiment mentioned above, explanation has been made on the example in which the data transmission unit 204*b* is configured to identify image files for which the notification e-mail is set to be transmitted as specified image files and image files that are set by the user to be transmitted to image storage server 300 in order to create a back up copy of the image files as non-specified image files, and transmit the specified image files to the image storage server 300 in priority to the non-specified image files. However, the data transmission unit 204*b* may be configured to identify the image files that are set by the user to be transmitted to the image storage server 300 in order to create a back up copy of the image files as specified image files and the image files for which the notification e-mail is set to be transmitted as non-specified image files.

(8) In the first to the third embodiments mentioned above, explanation has been made on the example in which the image storage server 300 is configured to prepare a notification e-mail containing the links 2*a* to the images and thumbnail images 2*c* shown in FIG. 2 and transmit the notification e-mail to destinations registered in the destination list. However, the image storage server 300 may also be configured to prepare an e-mail to which an image file is attached and transmit it to the destinations registered in the destination list.

The above described embodiments are examples, and various modifications can be made without departing from the scope of the invention.

What is claimed is:

1. A camera comprising:
   an image-capturing unit that captures an image of a subject to acquire image data;
   an image storing unit that stores data for a plurality of images acquired by the image-capturing unit in a storage medium;
   an image specifying unit that specifies data for one or more images from the plurality of images; and
   a transmission controlling unit connected to a first external device through a wireless communication device, configured to transmit the data for the specified images specified by the image specifying unit to the first external device through the wireless communication device and to transmit information about a destination of a notification to the first external device the notification indicating that the data for the specified images has been uploaded to the first external device through the wireless communication device,
   wherein the destination of the notification is a second external device other than the first external device, and
   wherein the image specifying unit specifies the destination related to the data for the specified images.

2. A camera according to claim 1, further comprising:
   an information storing unit that stores information for identifying the data for the specified images to the storage medium.

3. A camera according to claim 1, wherein the transmission controlling unit starts transmission of the data for the non-specified images when transmission of the data for the specified images is suspended according to instruction by the user.

4. A camera according to claim 3, wherein when the transmission of the data for the specified images is suspended and the transmission of the data for the non-specified images is started, the transmission controlling unit resumes the transmission of the data for the specified images after the transmission of the data for the non-specified images is completed.

5. A system comprising:
   a camera according to claim 1; and
   a server as the first external device, wherein
      the server includes:
         a receiving unit that receives all of the data for all of the specified images and at least a portion of the data for the non-specified images;
         a storage unit on which all of the data for the specified images and at least the portion of the data for the non-specified images received by the receiving unit are stored; and
         a transmitting unit that transmits a notification to the destination based upon the information about the destination of the notification, the notification indicating that the data for the specified images has been stored on the storage unit.

6. A system according to claim 5, wherein the receiving unit further receives from the camera the information about the destination of the notification.

7. The system according to claim 6, wherein the notification is transmitted to the destination by using e-mail.

8. A camera according to claim 1, wherein the notification is transmitted to the destination by using e-mail.

9. A camera according to claim 1, wherein the transmission controlling unit is configured to transmit the data for the specified images specified by the image specifying unit to the first external device in priority to the data for the non-specified images that are not specified by the image specifying unit.

10. A camera according to claim 9, wherein the transmission controlling unit changes transmission priority between the data for the specified images and the data for the non-specified images such that the data for the non-specified images are transmitted in priority to the data for the specified images according to instruction by the user.

11. A camera comprising:
   an image-capturing unit that captures an image of a subject to acquire image data;
   an image storing unit that stores data for a plurality of images acquired by the image-capturing unit in a storage medium;
   an image specifying unit that specifies data for one or more images from the plurality of images and specifies information about a destination of a notification, the notification indicating that the data for the specified images has been uploaded to an external device through a wireless communication device; and
   a transmission controlling unit connected to the external device through the wireless communication device, configured so that when transmitting the data for the plurality of images to the external device, the transmission controlling unit is configured to identify the data for the specified images and data for the non-specified images, to which the information about the destination of the notification is not related, that are not specified by the image specifying unit, and to transmit the data for the specified images to the external device through the wireless communication device in priority to the data for the non-specified images, wherein the transmission controlling unit starts transmission of the data for the non-specified images when transmission of the data for the specified images is suspended according to instruction by the user wherein the destination is other than the external device, and wherein when the transmission of the data for the specified images is suspended and the transmission of the data for the non-specified images is started, the transmission controlling unit resumes the transmission of the data for the specified images after the transmission of the data for the non-specified images is completed.

* * * * *